United States Patent
Ghosh et al.

(10) Patent No.: US 11,670,317 B2
(45) Date of Patent: Jun. 6, 2023

(54) DYNAMIC AUDIO QUALITY ENHANCEMENT

(71) Applicant: KYNDRYL, INC., New York, NY (US)

(72) Inventors: Sayan Acharya Ghosh, Singapore (SG); Prashant Jain, Singapore (SG); Ai Kiar Ang, Singapore (SG); Gary Kim Chwee Lim, Singapore (SG)

(73) Assignee: KYNDRYL, INC., New York, NY (US)

( * ) Notice: Subject to any disclaimer, the term of this patent is extended or adjusted under 35 U.S.C. 154(b) by 82 days.

(21) Appl. No.: 17/182,506

(22) Filed: Feb. 23, 2021

(65) Prior Publication Data

US 2022/0270628 A1   Aug. 25, 2022

(51) Int. Cl.
*G10L 21/02* (2013.01)
*G10L 25/78* (2013.01)
(Continued)

(52) U.S. Cl.
CPC .............. *G10L 21/02* (2013.01); *G06F 3/165* (2013.01); *G10L 25/18* (2013.01); *G10L 25/60* (2013.01);
(Continued)

(58) Field of Classification Search
CPC .......... H04R 2201/403; H04R 2420/07; H04R 27/00; H04R 3/005; G10L 15/22; G10L 15/30; G10L 21/02; G10L 15/01; G10L 17/06; G10L 15/1815; G10L 15/26; G10L 19/025; G10L 2021/02087; G10L 13/00; G10L 13/033; G10L 15/1822;
(Continued)

(56) References Cited

U.S. PATENT DOCUMENTS

| | | | |
|---|---|---|---|
| 7,991,163 B2 * | 8/2011 | Loether | H04R 27/00 381/26 |
| 9,338,551 B2 | 5/2016 | Thyssen et al. | |

(Continued)

FOREIGN PATENT DOCUMENTS

| | | |
|---|---|---|
| CN | 111354368 A | 6/2020 |
| KR | 101120913 B1 | 1/2012 |

OTHER PUBLICATIONS

Anonymous, "Method for Detecting Co-Located Devices in a Distributed Audio System", An IP.com Prior Art Database Technical Disclosure, IP.com No. IPCOM000255341D, IP.com Electronic Publication Date: Sep. 18, 2018, 3 pages.

(Continued)

*Primary Examiner* — Lun-See Lao
(74) *Attorney, Agent, or Firm* — Erik C. Swanson, Esq.; Blanche E. Schiller, Esq.; Heslin Rothenberg Farley & Mesiti P.C.

(57) ABSTRACT

A set of user pools can be determined based on location data associated with each device in an audio/video (A/V) conference. A key active user can be determined for each user pool of the set of user pools based on valid audio signals received from each device within each user pool. A determination can be made whether there is feedback within each user pool. Responsive to determining feedback in at least (Continued)

one user pool, speakers of devices within the at least one user pool can be disconnected except for the key active user device within each respective user pool.

20 Claims, 7 Drawing Sheets (51) Int. Cl.
G10L 25/18 (2013.01)
G06F 3/16 (2006.01)
H04R 3/02 (2006.01)
G10L 25/60 (2013.01)
H04R 29/00 (2006.01)

(52) U.S. Cl.
CPC ............... *G10L 25/78* (2013.01); *H04R 3/02* (2013.01); *H04R 29/001* (2013.01); *H04R 29/004* (2013.01)

(58) Field of Classification Search
CPC ......... G10L 15/00; G10L 15/25; G10L 17/04; G10L 21/0232; G10L 21/0272; G10L 21/028; G10L 21/0308; G10L 21/0356; G10L 21/0388; G10L 21/04; G10L 25/21; G10L 25/51; G10L 25/69; G10L 15/18; G10L 25/18; G10L 15/02; G10L 15/20; G10L 15/222; G10L 17/10; G10L 19/005; G10L 19/097; G10L 19/26; G10L 2021/02166; G10L 21/0208; G10L 21/0216; G10L 25/24; G10L 25/78; G10L 25/84; G10L 13/047; G10L 15/08; G10L 15/28; G10L 15/32

USPC ........................................ 381/93, 92; 700/94
See application file for complete search history.

(56) References Cited

U.S. PATENT DOCUMENTS

| 9,589,575 | B1* | 3/2017 | Ayrapetian ............... G10L 25/18 |
| 9,792,927 | B2 | 10/2017 | Fan |
| 10,079,866 | B2 | 9/2018 | Fang et al. |
| 10,291,783 | B2 | 5/2019 | Mehta |
| 10,536,286 | B1* | 1/2020 | Leblang ............... H04L 12/1818 |
| 2008/0175230 | A1* | 7/2008 | Brand ................. H04L 65/1053 370/352 |
| 2010/0142721 | A1* | 6/2010 | Wada ..................... H04R 27/00 381/77 |
| 2016/0127684 | A1* | 5/2016 | Hanson .................. G06Q 30/01 348/14.08 |
| 2020/0021910 | A1 | 1/2020 | Rollow, IV et al. |
| 2020/0204915 | A1 | 6/2020 | Olsson |
| 2021/0409547 | A1* | 12/2021 | Channapragada ....... H04N 7/15 |
| 2022/0137916 | A1* | 5/2022 | Varekamp ............... H04S 7/304 700/94 |

OTHER PUBLICATIONS

Anonymous, "Room Noise Reduction in Audio and Video Calls", An IP.com Prior Art Database Technical Disclosure, IP.com No. IPCOM000251964D, IP.com Electronic Publication Date: Dec. 12, 2017, 8 pages.

Mell et al., "The NIST Definition of Cloud Computing", Recommendations of the National Institute of Standards and Technology, Sep. 2011, 7 pages.

* cited by examiner

DYNAMIC AUDIO QUALITY ENHANCEMENT

BACKGROUND

The present disclosure relates generally to the field of computing, and in particular, to dynamic audio quality enhancement.

SUMMARY

Embodiments of the present disclosure include a method, computer program product, and system for audio quality enhancement. A set of user pools can be determined based on location data associated with each device in an audio/video (A/V) conference. A key active user can be determined for each user pool of the set of user pools based on valid audio signals received from each device within each user pool. A determination can be made whether there is feedback within each user pool. Responsive to determining feedback in at least one user pool, speakers of devices within the at least one user pool can be disconnected except for the key active user device within each respective user pool.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and in particular, to dynamic audio quality enhancement. While the present disclosure is not necessarily limited to such applications, various aspects of the disclosure can be appreciated through a discussion of various examples using this context.

While audio/video (A/V) conferencing technologies have improved dramatically, technical issues are still commonly encountered. For example, feedback howls originating from open microphones can distract participants within A/V conferences. Though user control can facilitate individual muting of participants with open microphones, this may not be completed within a timely manner and may result in loss of productivity. Further still, audio quality of participants can depend on microphone quality, audio-codec used (e.g., device dependencies), and network quality (e.g., jitter). Solutions are needed to improve audio quality within A/V teleconferences.

Aspects of the present disclosure relate to audio quality enhancement. A set of user pools can be determined based on location data associated with each device in an audio/video (A/V) conference. A key active user can be determined for each user pool of the set of user pools based on active valid audio signals received from each device within each user pool. A determination can be made whether there is feedback within each user pool. Responsive to determining feedback in at least one user pool, speakers of devices within the at least one user pool can be disconnected except for the key active user device within each respective user pool.

Reference will now be made to various concepts that can be used to enhance audio quality within aspects of the present disclosure.

Microphones used within A/V systems can receive a significant amount of background noise and these are not desirable to be considered "valid signals" (e.g., signals that correspond to speakers within an A/V conference). "Silence detection" is a technique implemented within aspects of the present disclosure to determine whether sound received by a microphone is a valid signal or background noise. Silence detection can include implementing an amplitude threshold (e.g., 40 dB), below which sound is considered background noise. Further, silence detection can be applied such that sounds received exclusively from the human speech band of frequencies (e.g., 80 Hz-300 Hz) are considered valid signals. Thus, if received sound is detected within the human speech frequency band range and is above the defined amplitude threshold, "silence detection" will indicate this noise as a valid signal.

The "HaaS effect" is a phenomenon of the human hearing where sound arriving within 40 ms and within 10 db difference in sound level appears to be a single sound to the human ear. Aspects of the present disclosure acknowledge this phenomenon and account for this effect by, in embodiments, combining sound signals received from multiple microphones which lie within the 40 ms window to enrich the final audio output.

"Fast Fourier Transform" (FFT) is used to process analog signals (e.g., signals with amplitude over time) into the frequency domain through a discrete Fourier transform (DFT). FFT can be used such that signals received from multiple devices can be aligned and compared within the frequency domain. In embodiments, FFT signatures received from multiple devices can be combined to enrich audio prior to converting the signals back to analog for playback into an A/V conference.

A "sliding window" is used in signal processing to compare multiple received signals (e.g., which may be converted to the frequency domain through FFT for comparison). When applying the "sliding window" technique, audio signals are aligned (based on frequency or time) such that the audio signals can be compared. In embodiments, if a sliding window is applied and two signals are considered a match, then audio processing can be completed to enhance quality (e.g., remove delay, match amplitude, etc.) associated with the matching signals. However, if a sliding window is applied and the signals do not match, then at least one of the incoming audio signals can be discarded. For example, audio signals received from a primary user (e.g., a host or speaker) can be preserved while audio signals received from a background user (e.g., a listener) can be discarded.

Figure 1:
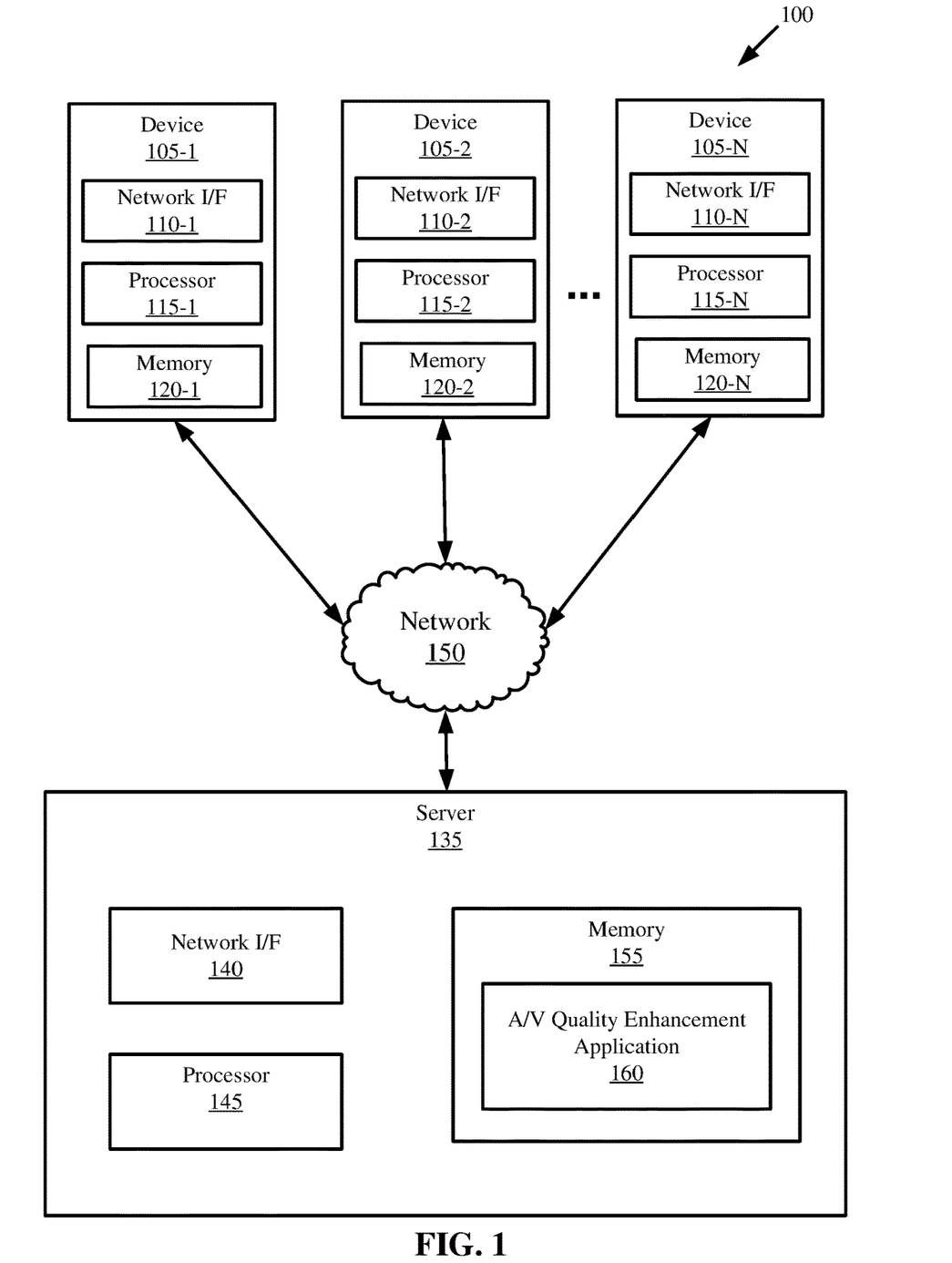
FIG. 1 is a block diagram illustrating an example computing environment in which illustrative embodiments of the present disclosure can be implemented.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., browser software, communications software, server software, natural language processing software, search engine and/or web crawling software, image processing software, etc.).

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 4.

The server includes an audio/video (A/V) quality enhancement application 160. The A/V quality enhancement application 160 can be configured to improve audio quality for devices within an A/V conference.

The A/V quality enhancement application 160 can first be configured to determine user pools for devices 105 over network 150. A "user pool" refers to one or more users that are connected to an A/V conference from the same physical location. Feedback and delay-based A/V issues can originate from multiple speakers/microphones connected to an A/V conference from the same vicinity. Thus, determining user pools (e.g., devices that share a common location) can be beneficial for improving A/V quality within A/V conferences. In some embodiments, user pools can be determined based on location data received from each device 105. For example, the user pools can be determined based on internet protocol (IP) addresses and IP subnets associated with devices 105. Devices sharing a common IP address can be considered to be within the same user pool. As another example, users sharing common subnets within a network can be clustered into respective user pools.

The A/V quality enhancement application 160 can then be configured to determine a "key active user" within each user pool. A "key active user" refers to a primary speaker (e.g., a primary device) associated with a given user pool. In embodiments, the key active user can be the user with the most speaking time from a user pool. For example, a timer can be set for each user from a user pool indicating the amount of time valid signals (e.g., based on the silence detection technique) are originating from the user's device. The user with the longest timer (e.g., highest elapsed time emitting valid audio signals) can then be considered a key active user. However, in some embodiments, the key active user can be manually defined. Further, in some embodiments, the key active user can be determined based on the most recently active user (e.g., the user that most recently transmitted a valid signal to the A/V conference) within the user pool.

The A/V quality enhancement application 160 can then be configured to identify feedback originating from a given user pool. If feedback is detected (e.g., a feedback loop is identified originating from one or more devices), then speakers of all devices that are not associated with the key active user within the user pool are disconnected. Disconnecting speakers can include muting, reducing volume, powering off or otherwise silencing speakers associated with devices that are not the key active user. This can prevent feedback originating from speakers nearby the key active user.

The A/V quality enhancement application 160 can then be configured to calculate a delay time (e.g., time of arrival (TOA), a time delay, delay) of valid signals for all users within the user pool with reference to the key active user by applying the sliding window technique. That is, all received audio signals from each respective device from a given user pool can be aligned (to the key active user or most recent speaker) based on time to determine delay with respect to the key active user. For all audio signals beyond a time delay threshold (e.g., the 40 ms HaaS window), microphones of corresponding devices can be disconnected. This can be completed as the delay in arrival is too large and thus can be considered disruptive to the A/V conference. For all signals within the threshold time window, FFT analysis can be completed to extract speech components (e.g., observed as frequency spikes) from each audio stream. Each stream can then be matched such that frequencies extracted from FFT align and then each corresponding audio stream can be converted back to the time domain (e.g., using an inverse Fourier transform (IFT)). The audio can then be played back to the A/V conference. If video is associated with the audio, the same delay applied to the audio can be applied to the video stream to maintain synchronization.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
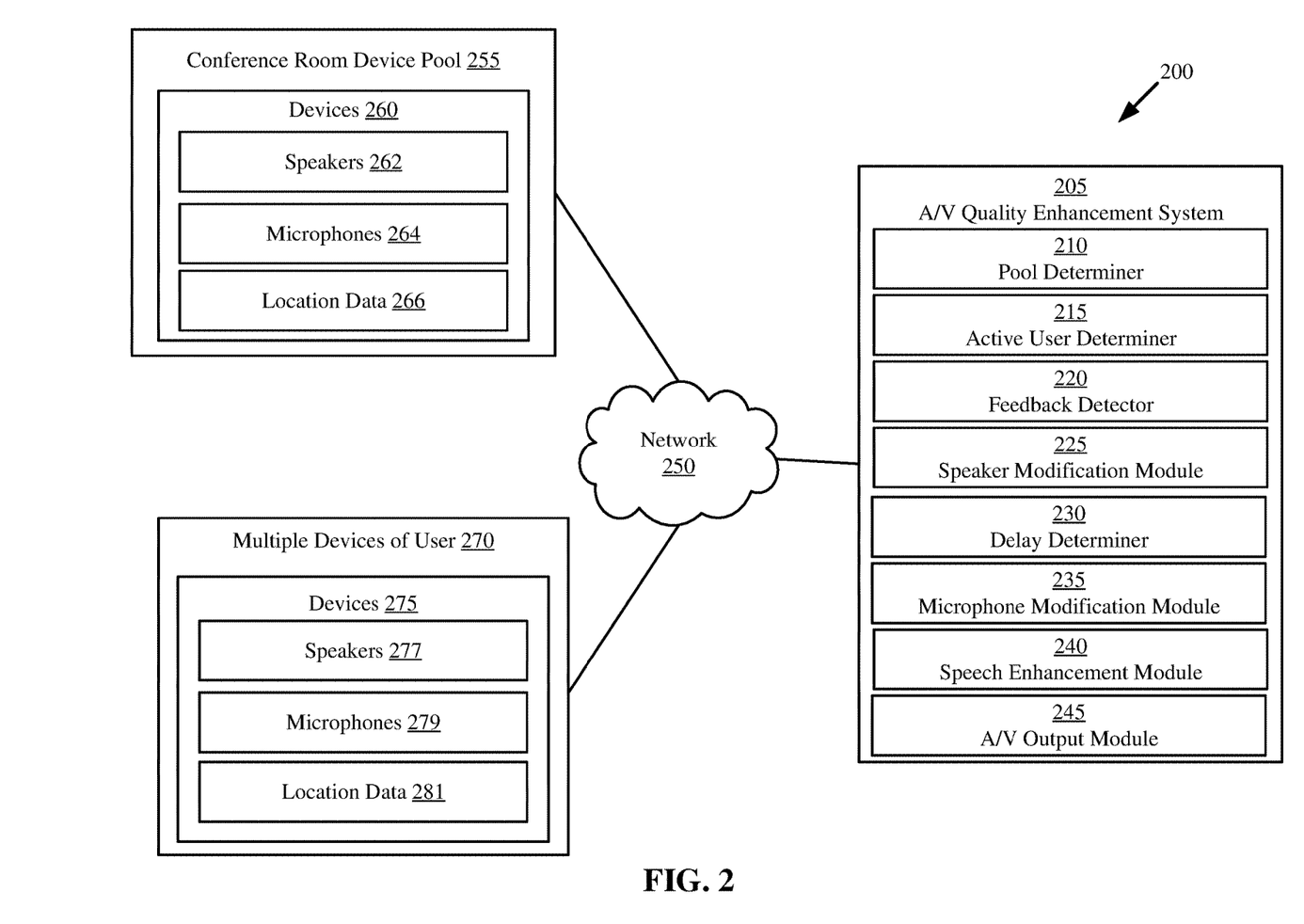
FIG. 2 is a diagram illustrating an example internet of things (IoT) environment in which illustrative embodiments of the present disclosure can be implemented.

Referring now to FIG. 2, illustrated is a block diagram of an example Internet of Things (IoT) environment 200 according to aspects of the present disclosure. The IoT environment 200 can include numerous components communicatively coupled by a network 250, such as, but not limited to, an A/V quality enhancement system 205, a conference room device pool 255, and multiple devices of a user 270. The various components within the IoT environment 200 can be processor executable instructions that can be executed by a dedicated or shared processor using received inputs. Further, one or more functionalities performed by the A/V quality enhancement system 205 can be performed by other components within the system (e.g., devices 260 and/or devices 275).

A pool determiner 210 can be configured to determiner user pools of devices that are connected to an A/V conference. The pool determiner 210 can be configured to determine user pools based on location data associated with devices connected to the A/V conference. For example, the pool determiner 210 can determine a first user pool corresponding to the conference room device pool 255 based on devices 260 sharing a common location (e.g., IP address or subnet) as apparent in location data 266. As another example, the pool determiner 210 can determine that multiple devices of a user 270 are within a second pool based on location data 281 associated with the devices 275.

An active user determiner 215 of the A/V quality enhancement system 205 can be configured to determine a key active user in each pool determined by the pool determiner 210. In embodiments, a key active user can be determined based on the user with the most speaking time. This can be completed based on silence detection, where a user having the most valid signal output time (e.g., audio output within the human speech frequency above a given amplitude threshold) within a given time window is designated as the key active user. However, the key active user can be determined in any other suitable manner. For example, in some embodiments, the key active user can be manually defined. In some embodiments, the key active user can be designated as the most recently active user (e.g., a user that most recently output a valid signal).

A feedback detector 220 of the A/V quality enhancement system 205 can be configured to detect whether feedback is originating from any user pool. In embodiments, feedback can be identified based on repeating frequencies that may be amplified and propagated through a speaker/microphone feedback loop.

In embodiments, if feedback is detected originating from a given user pool, then a speaker modification module 225 can be configured to disable (e.g., mute, disconnect, reduce volume of, etc.) speakers associated with the feedback. For example, speakers 262 of devices 260 that are not associated with a key active user within the conference room device pool 255 can be disconnected in response to feedback detection by the feedback detector 220. As another example, speakers 277 of devices 275 that are not associated with the key active user device within a pool corresponding to multiple devices of a user 270 can be disconnected in response to feedback detection.

A delay determiner 230 of the A/V quality enhancement system can be configured to determine a delay time (e.g., time of arrival (TOA)) of audio signals with respect to the key active user in each user pool. The delay can be determined by applying the sliding window technique with respect to the key active user (e.g., or most recently active user) audio signal. Thus, audio signals can be compared based on time and/or frequency (e.g., if FFT is applied) alignment. This can be completed as open microphones in the nearby vicinity of the key active user may contribute to disruptive interference within the A/V conference.

In embodiments, if delay exceeds (e.g., does not satisfy) a time delay threshold (e.g., a 40 ms HaaS window), a microphone modification module 235 can be configured to disconnect microphones associated with any devices which streamed audio signals exceeding the delay threshold. This can prevent disruptive interference to the A/V conference. For example, if delay associated with a device 260 within conference room pool 255 exceeds the delay threshold, then a corresponding microphone 264 associated with the device that exceeded the delay threshold can be disconnected (e.g., muted, reduced input volume for, etc.). As another example, if delay associated with a device 275 within the pool corresponding to multiple devices of user 270, then a corresponding microphone 279 associated with the device that exceeded the delay threshold can be disconnected.

If delay falls within the delay threshold (e.g., satisfies the delay threshold), then a speech enhancement module 240 of the A/V quality enhancement system can be configured to enhance the audio streams that are within the delay threshold. In embodiments, this can include performing a FFT to align frequency spikes associated with audio streams. Each frequency signature can be added and thereafter converted back to analog signals (e.g., without creating destructive interference or distortion).

An A/V output module 245 can then be configured to output the analog signals back to the A/V conference. In embodiments, attenuation of the volume of the audio signal can be completed prior to playback to devices within the same pool. In embodiments, amplification of the audio signal can be completed prior to playback to devices from a different pool. In embodiments where a video stream is associated with the audio signal, then the same delay (e.g., as applied based on FFT alignment) can be applied to the video stream to maintain synchronization prior to playback.

It is noted that one or more functionalities performed by the A/V quality enhancement system 205 can be completed within a buffering period prior to outputting A/V data to devices over the network 250. That is, upon receiving audio and/or video data from devices, the A/V quality enhancement system 205 can be configured to process (e.g., perform feedback detection, delay detection, and speech enhancement) the audio and/or video data prior to playback over network 250.

It is noted that FIG. 2 is intended to depict the representative major components of an example IoT environment 200. In some embodiments, however, individual components can have greater or lesser complexity than as represented in FIG. 2, components other than or in addition to those shown in FIG. 2 can be present, and the number, type, and configuration of such components can vary.

Figure 3A:
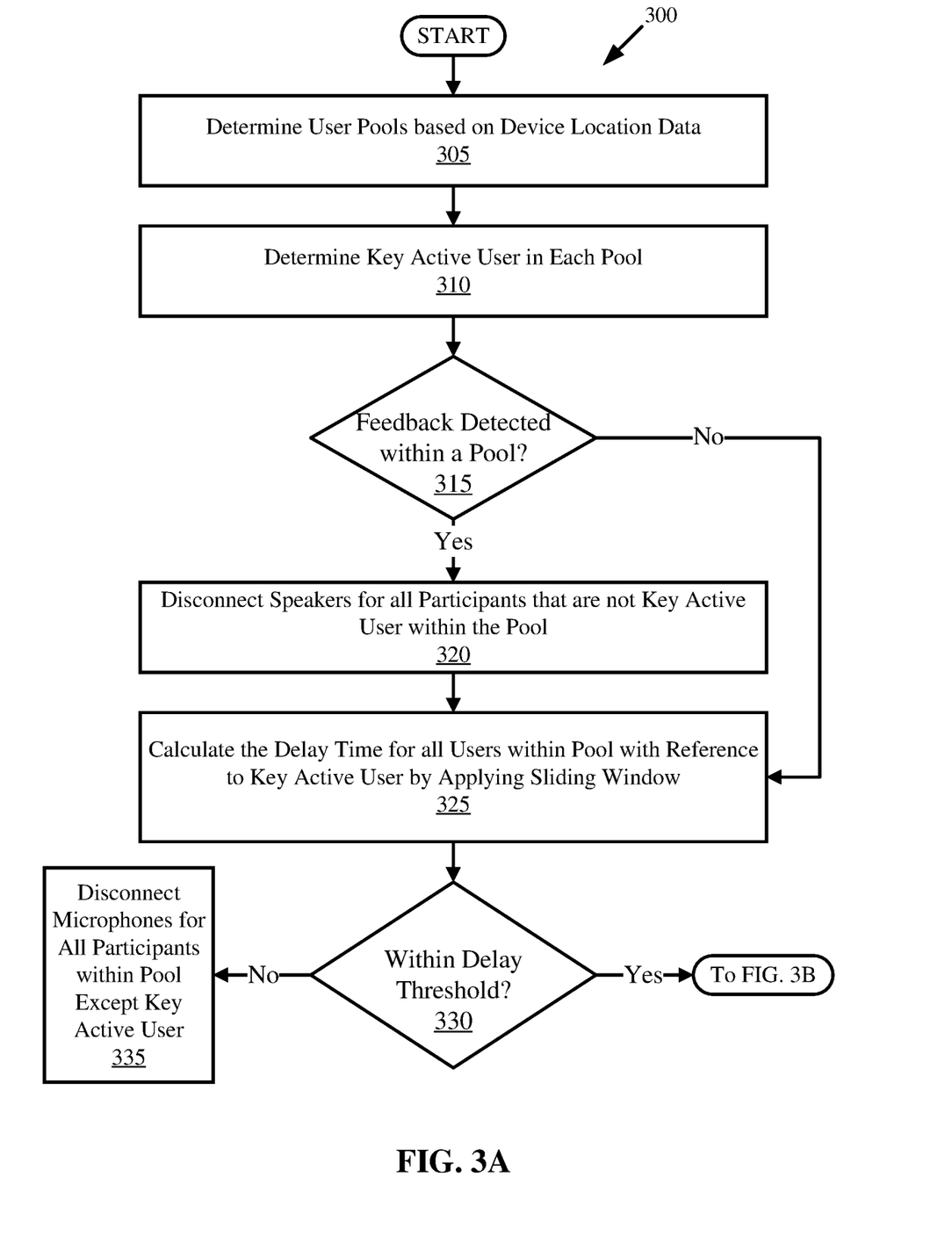
FIG. 3A and FIG. 3B are flow-diagrams collectively illustrating a method for enhancing audio quality, in accordance with embodiments of the present disclosure.
Figure 3B:
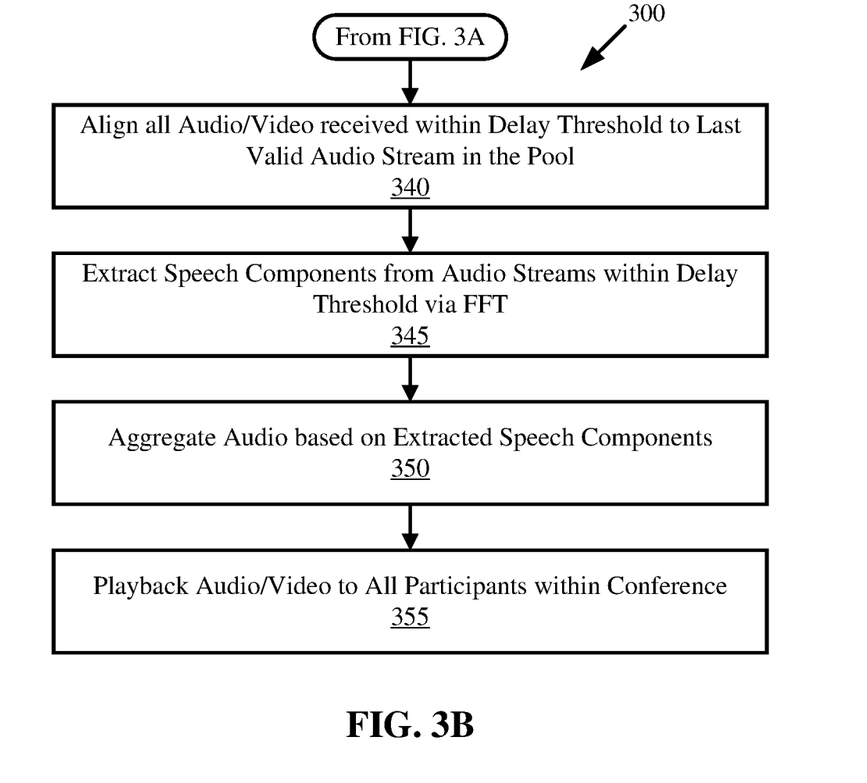

FIGS. 3A and 3B collectively depict a flow diagram of an example method 300 for A/V enhancement, in accordance with embodiments of the present disclosure. One or more operations of method 300 can be completed by one or more processing circuits (e.g., server 135, devices 105, devices 260, devices 275, A/V quality enhancement system 205).

Referring now to FIG. 3A, method 300 initiates at operation 305, where user pools are determined based on device location data. For example, user pools can be determined based on devices sharing common IP addresses or subnets. Each device or group of devices having a unique IP address or subnet can be considered a pool.

A key active user is then determined for each pool. This is determined at operation 310. The key active user can be determined in the same, or a substantially similar, manner as described with respect to the active user determiner 215 of FIG. 2. For example, key active users within pools can be determined based on the device with the highest active time outputting valid signals based on silence detection.

A determination is then made whether feedback is detected within a pool. This is illustrated at operation 315. If a determination is made that feedback is detected within a pool, then speakers for all participants (e.g., devices) that are not the key active user within the pool are disconnected. This is illustrated at operation 320. This can be completed such that speakers of listeners do not create a feedback loop with the key active speaker.

Upon disconnecting speakers for participants that are not the key active user at operation 320, or upon determining there is not feedback within a pool at operation 315, a delay time (e.g., time of arrival (TOA)) can be calculated for all users within each respective pool with reference to each pool's key active user by applying sliding window. This is illustrated at operation 325. The delay time calculated at operation 325 can represent delay between the key active user and any surrounding open microphones in the nearby vicinity (e.g., the user pool).

A determination is made whether the delay for each device within the pool is within a delay threshold. This is illustrated at operation 330. In some embodiments, the delay threshold can be based on the "HaaS window," approximately 30-50 ms between signals. However, the delay threshold can be set to any suitable value (e.g., 5 ms, 40 ms, 200 ms, 1 s, etc.). If delay of any devices within the pool is not within the delay threshold, then microphones of devices which exceed (e.g., do not satisfy) the delay threshold are disconnected. If delay of devices within the pool is within the delay threshold, then method 300 proceeds to FIG. 3B.

Referring now to FIG. 3B, method 300 proceeds to operation 340 where audio signals received within the delay threshold are delayed to the same timing as the audio signal received from the last valid audio stream in the pool. This is illustrated at operation 340. In embodiments, alignment of audio/video signals can be completed based on an FFT frequency alignment, where frequency spikes are aligned. In some embodiments, alignment of audio/video signals can be completed based on time (e.g., for analog signals).

Speech components are then extracted from the audio streams within the delay threshold via FFT. This is illustrated at operation 345. The audio is then aggregated based on the extracted speech components. This is illustrated at operation 350. Audio/video is then played back to participants within the conference. This is illustrated at operation 355. In some embodiments, audio signals can be attenuated for users within the same pool. In some embodiments, audio signals can be amplified or otherwise enhanced for users originating from a different pool.

The aforementioned operations can be completed in any order and are not limited to those described. Additionally, some, all, or none of the aforementioned operations can be completed, while still remaining within the spirit and scope of the present disclosure.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
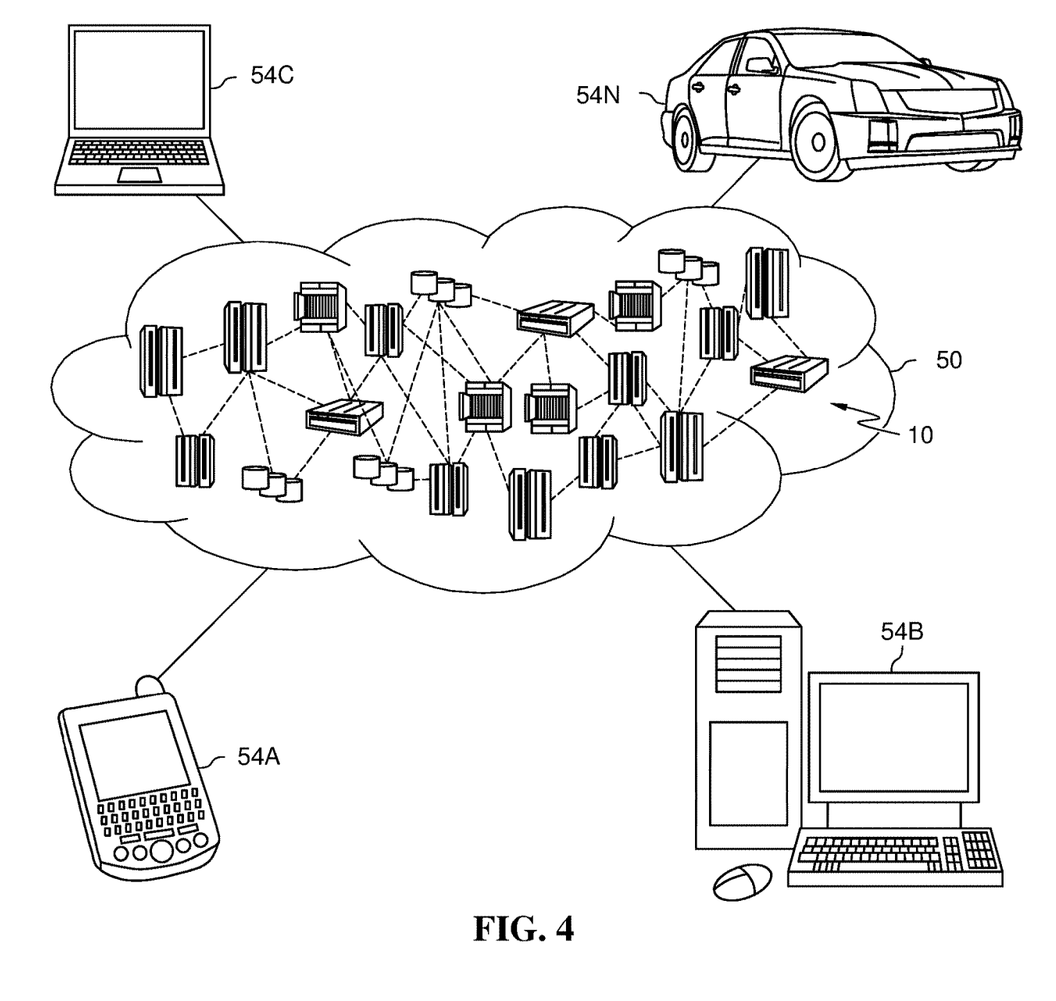
FIG. 4 is a diagram illustrating a cloud computing environment, in accordance with embodiments of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
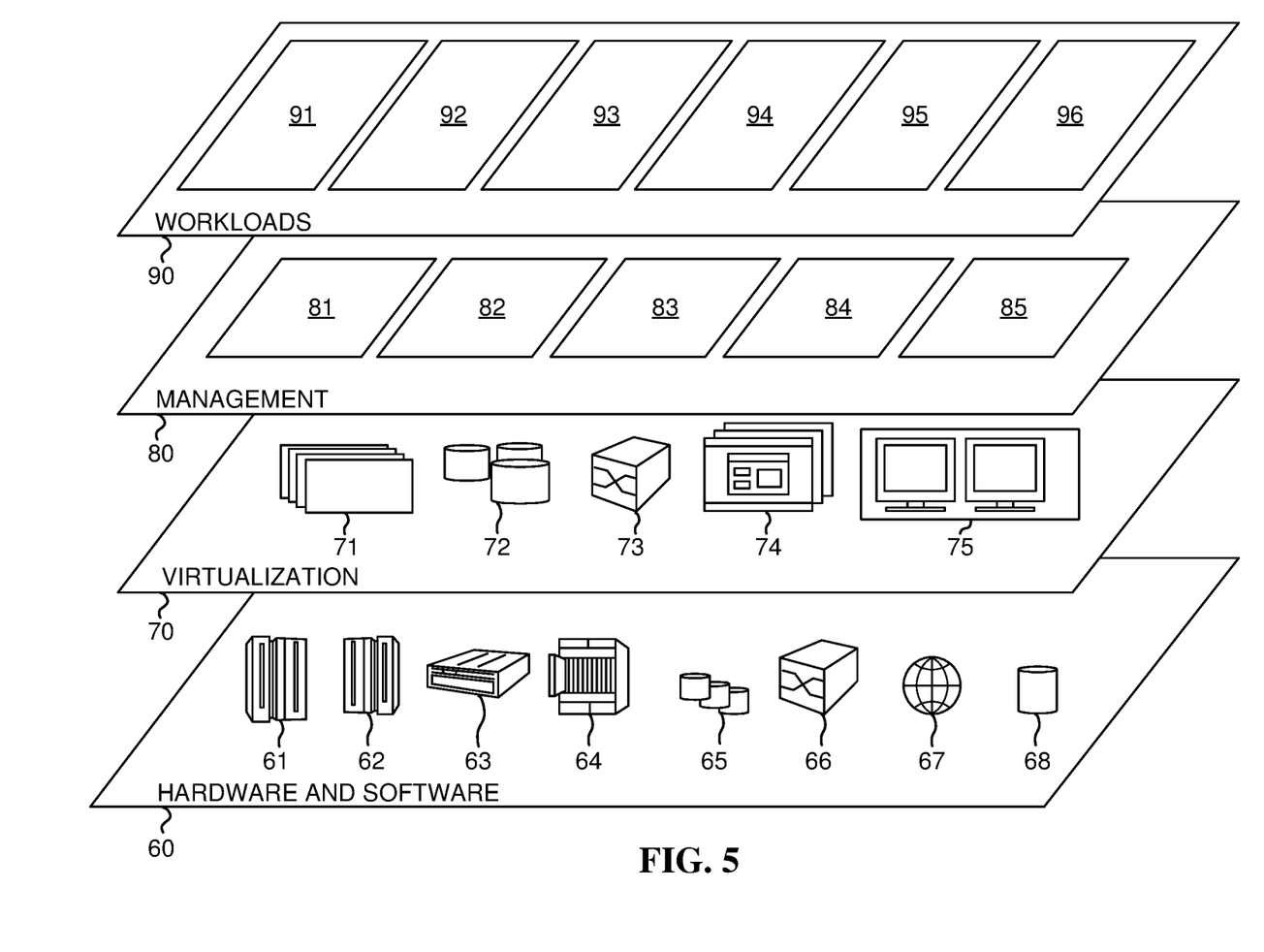
FIG. 5 is a block diagram illustrating abstraction model layers, in accordance with embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and A/V enhancement 96.

Figure 6:
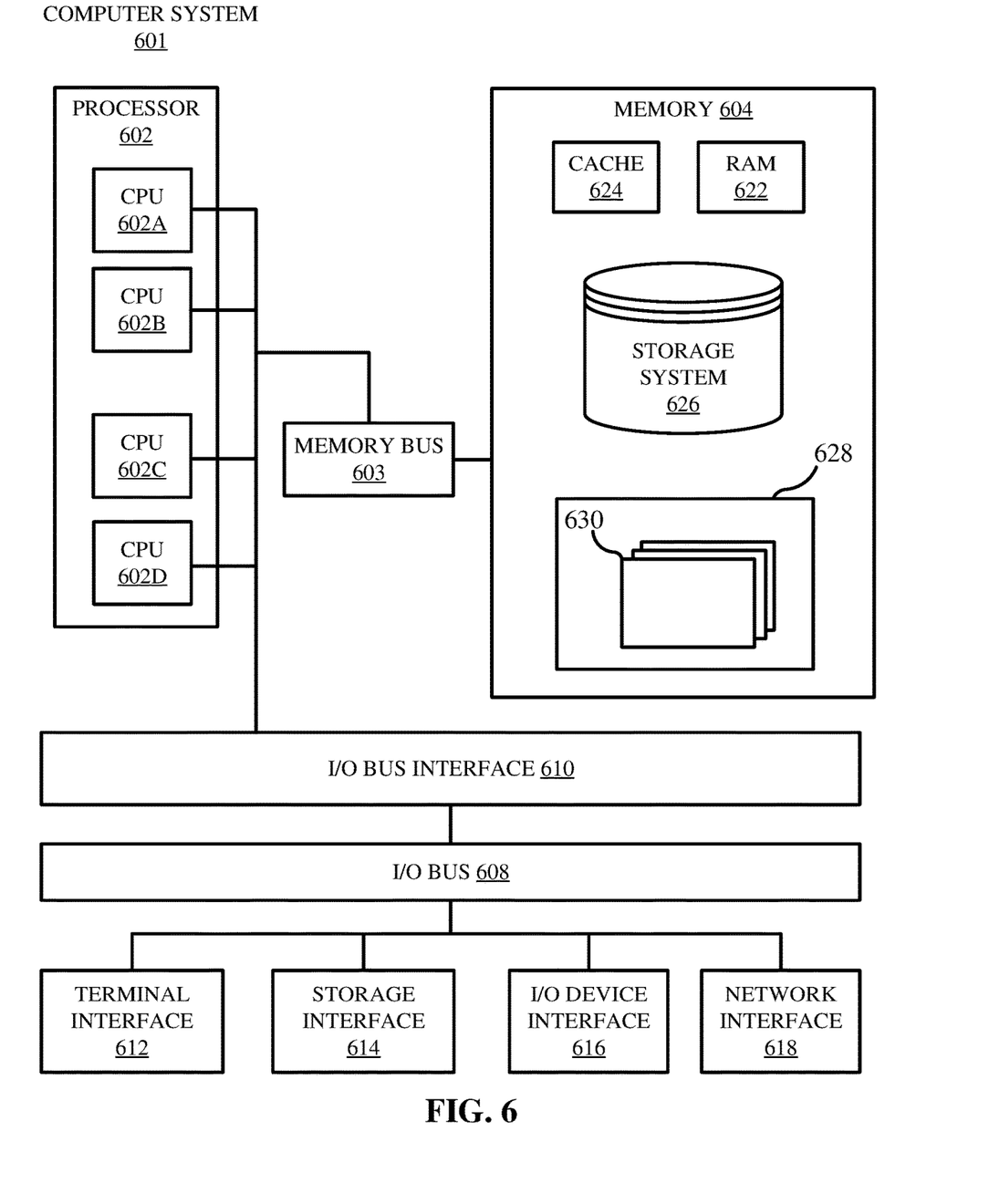
FIG. 6 is a high-level block diagram illustrating an example computer system that may be used in implementing one or more of the methods, tools, and modules, and any related functions, described herein, in accordance with embodiments of the present disclosure.

Referring now to FIG. 6, shown is a high-level block diagram of an example computer system 601 (e.g., devices 105 and server 135) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   determining, based on location data associated with a plurality of devices in an audio/video (A/V) conference, a set of user pools, the set of user pools including the plurality of devices and including, at least, one user pool and another user pool;
   determining, based on active valid audio signals received from at least a portion of the plurality of devices of the set of user pools, at least, one key active user device for the one user pool and another key active user device for the another user pool;
   determining that there is feedback within the one user pool, wherein the feedback is identified based on repeating frequencies amplified and propagated through a speaker to microphone feedback loop;
   disconnecting, in response to determining that there is feedback in the one user pool, speakers of devices within the one user pool except the one key active user device within the one user pool; and
   performing the determining and the disconnecting for, at least, the another user pool.

2. The method of claim 1, further comprising:
   calculating a time delay in which audio is received for each device within each user pool with reference to each key active user device; and
   disconnecting, for each device where the time delay exceeds a time delay threshold, microphones of each device emitting audio that exceeded the time delay threshold.

3. The method of claim 2, further comprising:
   enhancing, for each device where the time delay is within the time delay threshold, audio by aligning the audio received from each device where the time delay is within the time delay threshold with the audio output by the key active user device.

4. The method of claim 3, further comprising: playing back the enhanced audio to the A/V conference.

5. The method of claim 4, wherein the played back audio is attenuated for users within a same user pool.

6. The method of claim 3, wherein audio is aligned by converting analog signals representing the audio to a frequency domain using Fast Fourier Transform (FFT).

7. The method of claim 1, wherein the one key active user device is determined based on the one key active user device having a highest elapsed time period of valid audio signals based on silence detection.

8. The method of claim 1, wherein for each user pool of the set of user pools, based on determining that there is feedback in a given user pool, a speaker of a key active user device of the given user pool remains active and speakers of other devices of the given user pool are disconnected.

9. A system comprising:
   one or more processors; and
   one or more computer-readable storage media storing program instructions which, when executed by the one or more processors, are configured to cause the one or more processors to perform a method comprising:
      determining, based on location data associated with a plurality of devices in an audio/video (A/V) conference, a set of user pools, the set of user pools including the plurality of devices and including, at least, one user pool and another user pool;
      determining, based on active valid audio signals received from at least a portion of the plurality of devices of the set of user pools, at least, one key active user device for the one user pool and another key active user device for the another user pool;
      determining that there is feedback within the one user pool, wherein the feedback is identified based on repeating frequencies amplified and propagated through a speaker to microphone feedback loop;
      disconnecting, in response to determining that there is feedback in the one user pool, speakers of devices within the one user pool except the one key active user device within the one user pool; and
      performing the determining and the disconnecting for, at least, the another user pool.

10. The system of claim 9, wherein the method performed by the one or more processors further comprises:
    calculating a time delay in which audio is received for each device within each user pool with reference to each key active user device; and
    disconnecting, for each device where the time delay exceeds a time delay threshold, microphones of each device emitting audio that exceeded the time delay threshold.

11. The system of claim 10, wherein the method performed by the one or more processors further comprises:
    enhancing, for each device where the time delay is within the time delay threshold, audio by aligning the audio received from each device where the time delay is within the time delay threshold with the audio output by the key active user device.

12. The system of claim 11, wherein the method performed by the one or more processors further comprises:
    playing back the enhanced audio to the A/V conference.

13. The system of claim 12, wherein the played back audio is attenuated for users within a same user pool.

14. The system of claim 11, wherein audio is aligned by converting analog signals representing the audio to a frequency domain using Fast Fourier Transform (FFT).

15. The system of claim 9, wherein the one key active user device is determined based on the one key active user device having a highest elapsed time period of valid audio signals based on silence detection.

16. A computer program product comprising one or more computer readable storage media, and program instructions collectively stored on the one or more computer readable storage media, the program instructions comprising instructions configured to cause one or more processors to perform a method comprising:
    determining, based on location data associated with a plurality of devices in an audio/video (A/V) conference, a set of user pools, the set of user pools including the plurality of devices and including, at least, one user pool and another user pool;
    determining, based on active valid audio signals received from at least a portion of the plurality of devices of the set of user pools, at least, one key active user device for the one user pool and another key active user device for the another user pool;
    determining that there is feedback within the one user pool, wherein the feedback is identified based on repeating frequencies amplified and propagated through a speaker to microphone feedback loop;
    disconnecting, in response to determining that there is feedback in the one user pool, speakers of devices within the one user pool except the one key active user device within the one user pool; and performing the determining and the disconnecting for, at least, the another user pool.

17. The computer program product of claim 16, wherein the method performed by the one or more processors further comprises:
calculating a time delay in which audio is received for each device within each user pool with reference to each key active user device; and
disconnecting, for each device where the time delay exceeds a time delay threshold, microphones of each device emitting audio that exceeded the time delay threshold.

18. The computer program product of claim 17, wherein the method performed by the one or more processors further comprises:
enhancing, for each device where the time delay is within the time delay threshold, audio by aligning the audio received from each device where the time delay is within the time delay threshold with the audio output by the key active user device.

19. The computer program product of claim 18, wherein the method performed by the one or more processors further comprises:
playing back the enhanced audio to the A/V conference.

20. The computer program product of claim 16, wherein the one key active user device is determined based on the one key active user device having a highest elapsed time period of valid audio signals based on silence detection.

\* \* \* \* \*